UNITED STATES PATENT OFFICE.

GASTON PILET AND CLÉMENT CARRY, OF BESANÇON, FRANCE.

PLATING WITH PALLADIUM.

SPECIFICATION forming part of Letters Patent No. 330,149, dated November 10, 1885.

Application filed June 18, 1885. Serial No. 169,105. (Specimens.) Patented in France November 11, 1884, No. 165,243.

*To all whom it may concern:*

Be it known that we, GASTON PILET and CLÉMENT CARRY, both citizens of the Republic of France, residing at Besançon, in the Department of Doubs and Republic of France, have invented new and useful Improvements in Plating with Palladium, (for which we have obtained Letters Patent in France, dated November 11, 1884, No. 165,243,) of which the following is a specification.

This invention has for its object to provide an improved process electroplating with palladium; and it consists in introducing the articles to be plated into a bath containing chloride of palladium, phosphate of ammonia, and an alkaline substance—such as phosphate of soda or liquid ammonia—and then exposing such articles to the action of an electric current.

To prepare the palladium bath, take ten (10) grams of palladium in small pieces or reduce the same to small pieces, and place these pieces into a matrass with a mixture of seventy-five grams of concentrated chlorohydric acid and fifty grams of azotic or nitric acid.

After the solution is complete evaporate to dryness in a porcelain capsule, and to the brown-black residue add one hundreds grams of distilled water. The solution thus obtained has added to it, in a warm state, a solution of phosphate of ammonia, and the liquid thus formed is of a turbid yellowish appearance. The solution of phosphate of ammonia above named can be produced by dissolving one hundred grams of phosphate of ammonia in five hundred grams of distilled water.

The solution of palladium, chlorohydric acid, nitric acid, and phosphate of ammonia above set forth has added to it a solution of five hundred grams of pure phosphate of soda in four liters of distilled water, the mixture being made in a porcelain vessel or capsule or in an enameled cast vessel, and boiled until all ammoniacal odor has disappeared and the liquid becomes clear and white; then add ten grams of benzoic acid, the dissolving of which is accomplished while stirring with a glass rod; allow the solution to cool, and then filter.

According as a more or less concentrated bath is desired, add from one to three liters of distilled water. Thus prepared the bath is ready for the palladium plating. The formula of this bath may be expressed as follows: chloride of palladium, dry, ten grams metal; distilled water, five liters; phosphate of ammonia, one hundred grams; phosphate of soda, five hundred grams; benzoic acid, ten grams. The benzoic acid may be omitted, but it bleaches the deposit and renders the deposit more striking upon iron and steel.

To use this bath, place it in a vessel of glass or porcelain. The bath is used cold, if it is desired to have a steel-color deposit. If a white deposit is required, heat the bath from 40° to 50° centigrade. For plating iron and steel it is better to heat the bath.

The pile which we employ is the Leclanché pile, because of its feeble current. Two to four elements suffice, nevertheless. Other piles or batteries with feeble currents could be employed. The anode is of platinum. The duration of the operation is from five to ten minutes, according to the thickness of the deposit and the size of the objects.

The objects to be plated with palladium should be very clean, as for gold-plating, silver-plating, nickel-plating, and the like.

Another bath which gives good results can be prepared as follows: After having dissolved ten grams of palladium, as above set forth, the solution is reduced to a sirupy consistency in a porcelain capsule or vessel. The solution is allowed to cool, and into this product are poured two hundred grams of distilled water, to detach the product from the walls of the vessel. Ammonia (volatile alkali) is then added drop by drop, until the precipitate has a beautiful flesh color, when the addition of ammonia is stopped. The precipitate is thrown on a filter and washed three times with distilled water. The water from the filtered mass, which water may contain palladium, is collected for eventual use.

Also, in addition to the last above-named proceeding, dissolve three hundred grams of phosphate of ammonia in three or four liters of distilled water. Heat and dilute the precipitate, the flesh color of which soon disappears, leaving the bath colorless. Boil until the ammoniacal odor disappears, and the liquid, which was alkaline, becomes slightly acid. This bath can be used warm or cold, like the former.

The formula of this last-named bath may be expressed as follows: distilled water, five liters; chloride of palladium acid, ten grams metal; liquid ammonia until a flesh-colored precipitate is obtained; phosphate of ammonia, three hundred grams. If desired, benzoic acid may be added, according as a more or less clear color is desired.

Having thus described our invention, what we claim is—

The process of electroplating with palladium which consists in introducing the articles to be plated into a bath containing chloride of palladium, phosphate of ammonia, and an alkaline substance—such as phosphate of soda or liquid ammonia—and then exposing them to the action of an electric current.

In testimony whereof we have hereunto set our hands in the presence of two subscribing witnesses.

GASTON PILET.
CLÉMENT CARRY.

Witnesses:
  EMILE PAPY,
  CLÉMENT BELLENOÉ.